United States Patent [19]
Evans

[11] Patent Number: 6,033,332
[45] Date of Patent: Mar. 7, 2000

[54] CONTINUOUSLY VARIABLE TRANSMISSION

[76] Inventor: Shelby A. Evans, P.O. Box 2671, Cleveland, Ga. 30528

[21] Appl. No.: 09/148,758

[22] Filed: Sep. 4, 1998

Related U.S. Application Data

[60] Provisional application No. 60/081,152, Apr. 9, 1998.
[51] Int. Cl.[7] .................. F16H 47/04; F16H 37/02; F16H 3/44
[52] U.S. Cl. ..................... 475/80; 475/219; 475/297
[58] Field of Search .................... 475/72, 80, 89, 475/13, 218, 219, 296, 297

[56] References Cited

U.S. PATENT DOCUMENTS

| | | | |
|---|---|---|---|
| 2,362,542 | 11/1944 | De Lancey | 475/72 |
| 2,924,123 | 2/1960 | Giles | 475/72 |
| 4,327,604 | 5/1982 | Evans . | |
| 4,854,190 | 8/1989 | Won . | |
| 4,990,127 | 2/1991 | Roberts . | |
| 4,994,002 | 2/1991 | Valotto et al. | 475/72 |
| 5,071,391 | 12/1991 | Kita | 475/80 |
| 5,299,985 | 4/1994 | Johnston . | |
| 5,512,021 | 4/1996 | Shash . | |
| 5,645,506 | 7/1997 | Mleczko | 475/104 X |
| 5,649,876 | 7/1997 | Morishita | 475/45 X |

Primary Examiner—Charles A Marmor
Assistant Examiner—Roger Pang
Attorney, Agent, or Firm—Hinkle & Associates, P.C.

[57] ABSTRACT

The invention comprises an all gear mechanism for a continuously variable transmission that provides a wide range of output speeds and torque. The basic elements of the transmission are two planetary gear sets used as a power divider and a power combiner along with a one-way clutch and a hydraulic pump and hydraulic pump control devices. The controlling devices provide a continuously variable force against the low rpm power path. A high rpm gear train and a low rpm gear train are provided to vary the output. Appropriate sized gears are used to produce the desired overall output ratio. The output ratio is determined by engine capability or by the operator.

7 Claims, 6 Drawing Sheets

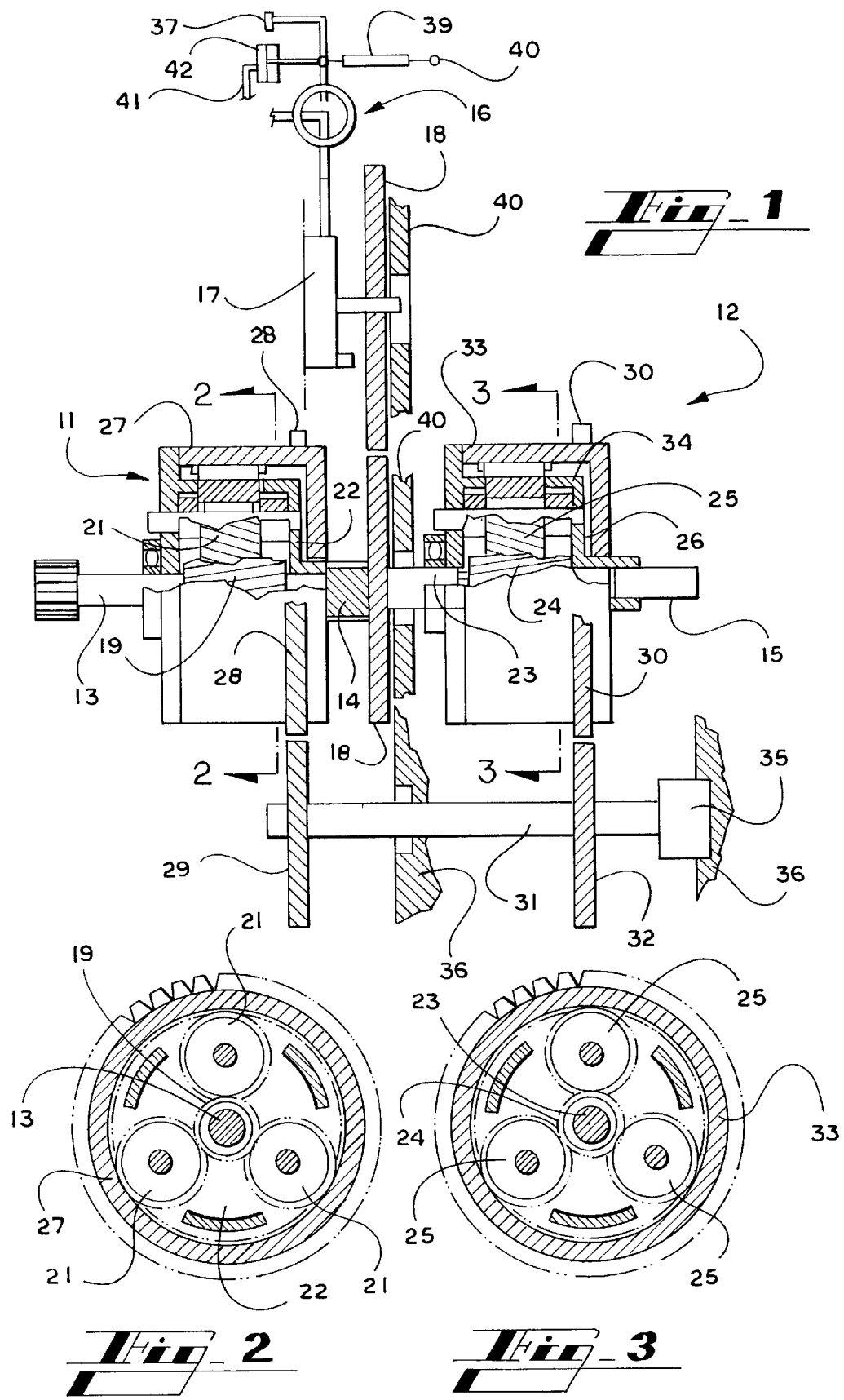

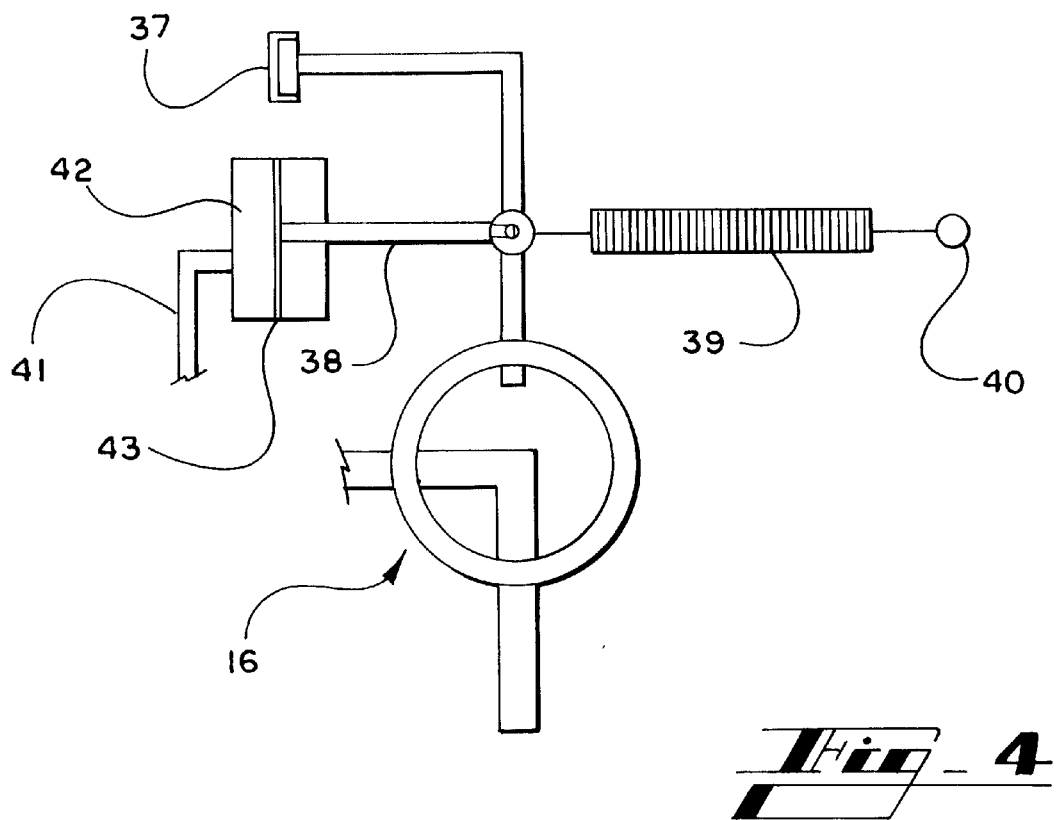
Fig_4
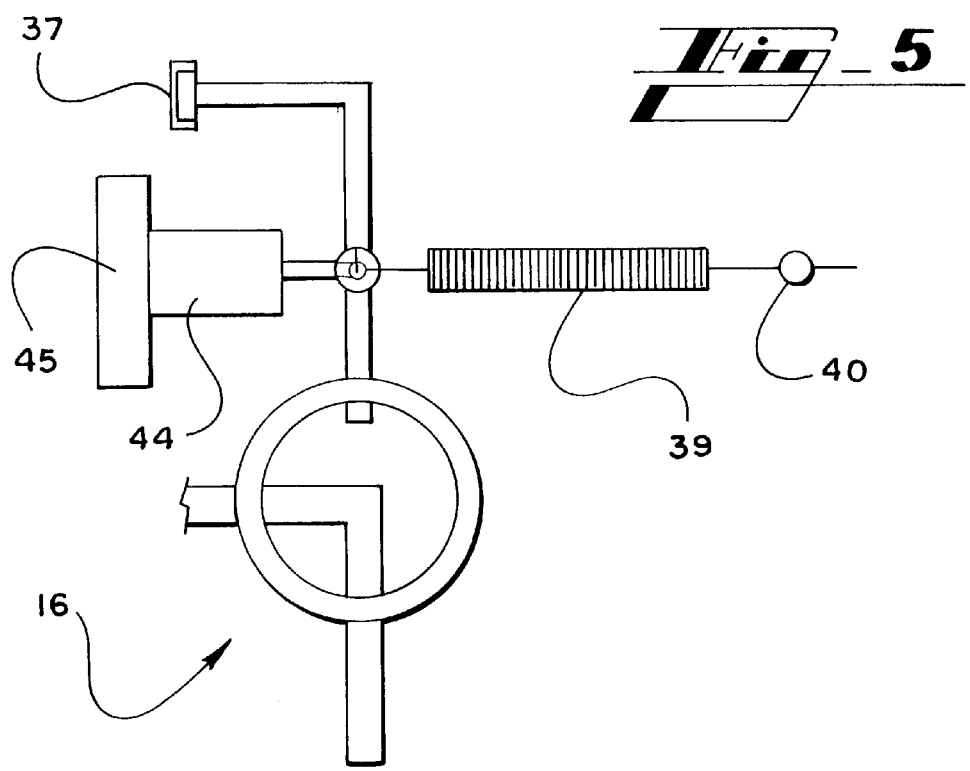
Fig_5

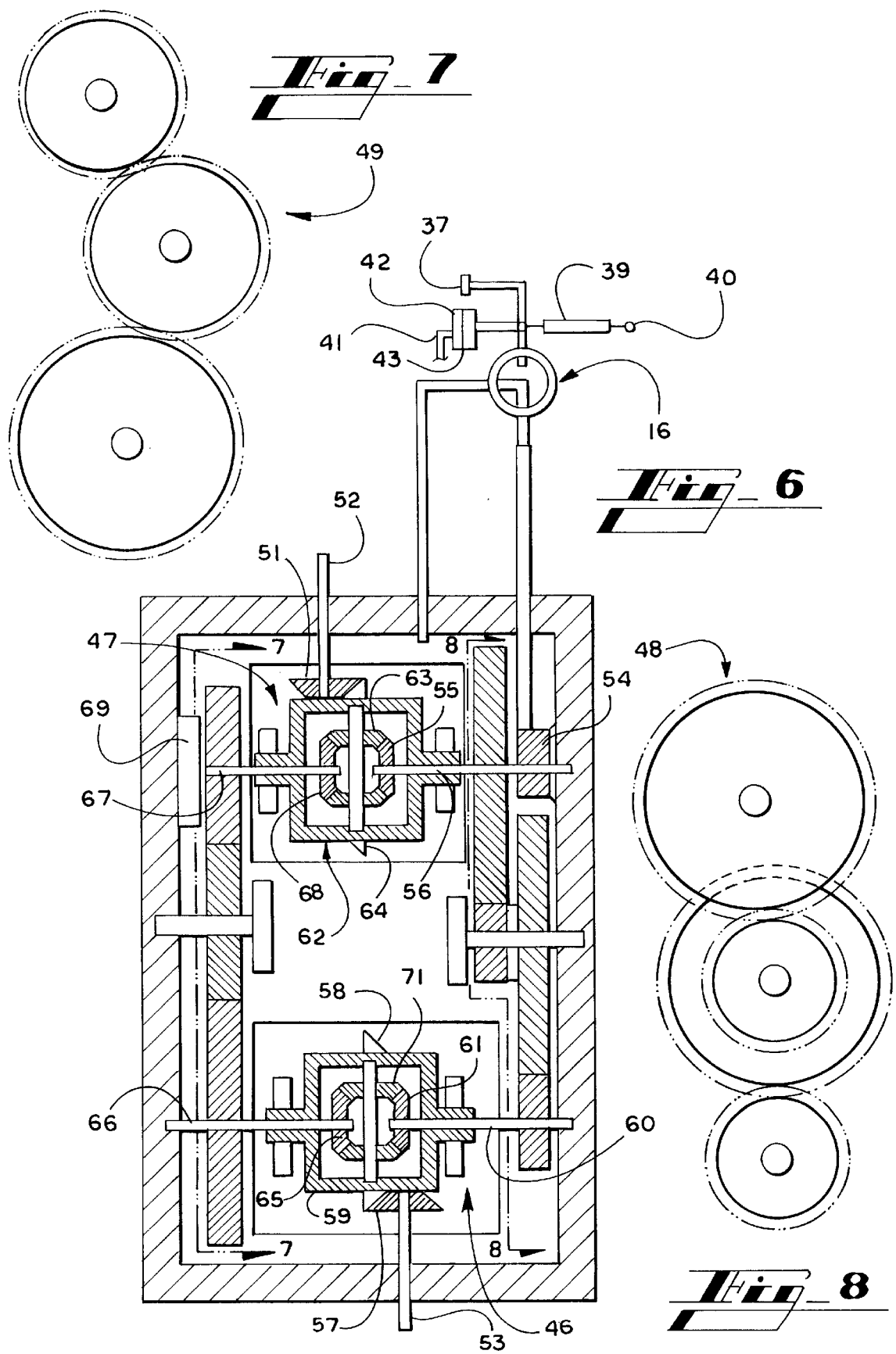

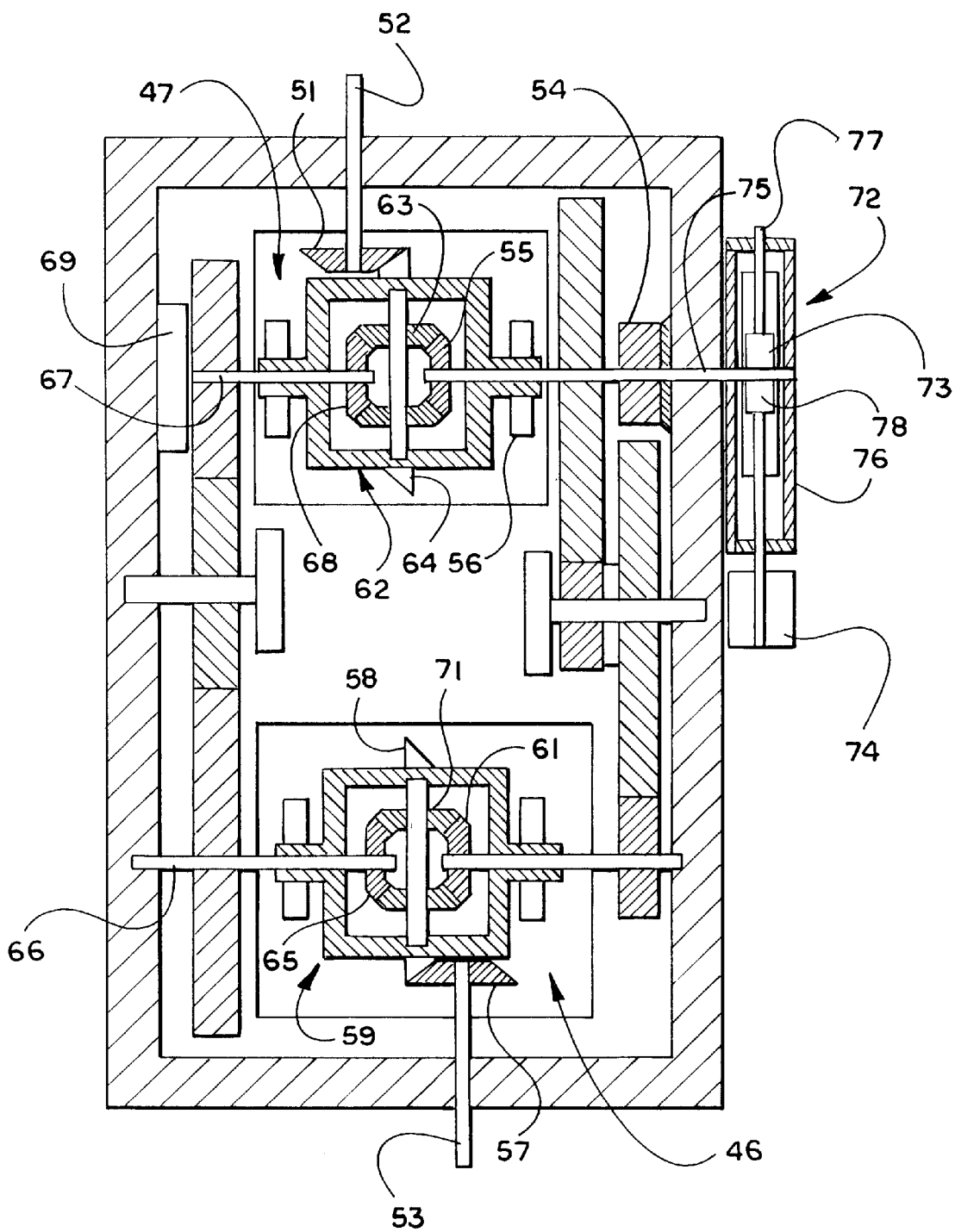
Fig_11

CONTINUOUSLY VARIABLE TRANSMISSION

CROSS-REFERENCE TO RELATED APPLICATION

This application claims the benefit of U.S. Provisional Application No. 60/081,152 filed on Apr. 9, 1998.

BACKGROUND OF THE INVENTION

I. Field of the Invention

The present invention relates generally to the field of infinitely variable transmissions and, more particularly, to a continuously variable ratio transmission which is either manually or automatically controlled. The power is transmitted through gears which are fully engaged at all times. The invention also utilizes a planetary gear set as a power divider, which is also connected to a planetary gear set which acts as a power combiner.

II. Description of the Related Art

A typical vehicle transmission is shifted in specific and discrete steps between a high torque, low speed mode for when the vehicle is initially moved, and a high speed, low torque mode for when the vehicle is operating at normal highway speeds. In a case of a manual transmission, the shifting is accomplished by changing the engagement of various gears and gear sets. In an automatic transmission, the shifting is accomplished by controlling the engagement of various friction elements and their relationships to one another. Because of shifting in discrete steps, the efficiency of the operation is somewhat lacking. Obviously, the most efficient operation of a vehicle would be improved if the transmission could have continuously adjusted ratios to compensate for changing operating conditions.

Auto makers have attempted for many years to provide a continuously variable transmission which would allow high efficiency operation of an engine under high load conditions, especially when accelerating. The most successful continuously variable transmissions now being used are those which are belt-driven systems that adjust gear ratio through the use of variable diameter pulleys.

These belt driven transmissions have been plagued with relatively low time between overhaul, and by low reliability, due to excessive wear of the flexible belts connecting the pulleys. Current automatic automobile transmissions utilize hydraulics and soft clutches to transmit the power. Both the belt-driven transmissions and the current automatic transmissions dissipate energy and require substantial maintenance. In addition, other continuously variable transmission designs have been developed to include hydraulic designs and traction drives that rely on transfer of rotation by means of hydraulic fluid or by the interaction of adjacent rotating structures. Both of these types of drives, however, are currently unable to supply sufficient torque for automotive or heavy industrial use. Many of these types of designs are also load sensitive and are unable to drive vehicles having high loads.

In view of the above, there is a need for a reliable and durable continuously variable transmission that can be used to improve the versatility and operating efficiency of internal combustion engines. It is believed that the present invention will meet the need of such a transmission by providing dual power paths without the use of clutches or torque converters, and which will allow precise control of the shifting between the various power paths.

SUMMARY OF THE INVENTION

The present invention comprises an all gear power transmission device in which all gears are fully engaged at all times. No clutch mechanisms are utilized, except for an overrunning clutch mechanism to prevent reverse rotation. In one embodiment of the invention, the gear drive comprises two planetary gear sets in series. In the low rpm/high torque mode, both sets of gears provide rpm reduction. In the higher rpm/low torque mode, the gear sets provide a power divider and a power combiner function. A hydraulic pump provides resistance to rotation of the low rpm gears, and an overrunning clutch prevents reverse rotation of the high rpm gears. Between high rpm and low rpm when the transmission operates, power flows through both gear sets and the transmission is controlled by a hydraulic pump output valve which is externally controlled either manually or automatically.

In a second embodiment of the invention, there are two planetary gear sets in parallel arrangement. The overall concept remains the same as in the first embodiment, however, the second embodiment provides the advantage of scaling up to large size load applications and provides easily changeable high and low gear sets. In the second embodiment, the first planetary gear set provides the power divider function, and the second planetary gear set provides the power combiner function. In this embodiment, a hydraulic pump provides resistance to the rotation of the low rpm gears and a one-way clutch prevents reverse rotation of the high rpm gears. As in the first embodiment between high rpm and low rpm, power flows through both gear sets and is controlled by the hydraulic pump valve which is externally controlled either manually or automatically.

It is an object of the present invention to provide a continuously variable transmission wherein the power is transmitted solely through gears without the use of belts, pulleys or hydraulics to transmit the power.

Yet another object of the invention is to provide a continuously variable transmission wherein the ratios can be varied continuously by manual control, manifold vacuum or by a computer with various inputs.

An object of the invention is to provide a transmission wherein excessive heat is not generated by hydraulic power transmission or by clutch engagement for changing gear ratios.

Yet other objects of the invention provide for a continuously variable transmission which is versatile in its use, is easily controlled by simple and reliable controls, and which will be easily scaled up or scaled down for heavy or lighter load applications.

The present invention will provide an improved infinitely variable transmission which will allow selective connection from input to output.

Other objects, advantages and capabilities of the invention will become apparent from the following description taken in conjunction with the accompanying drawings showing preferred embodiments of the invention.

BRIEF DESCRIPTION OF THE DRAWINGS

FIG. 1 is a elevation view in diagrammatic form, partially in section, showing a first embodiment of the invention;

FIG. 2 is a vertical section view taken along lines 2—2 of FIG. 1;

FIG. 3 is a vertical section view taken along lines 3—3 of FIG. 1;

FIG. 4 is a diagrammatic view of the vacuum actuated hydraulic control system for controlling the invention;

FIG. 5 is a diagrammatic view of another control system for the invention utilizing a computer hydraulic control feature;

FIG. 6 is a vertical section view of a second embodiment of the invention for heavy duty applications;

FIG. 7 is a vertical elevation view taken along lines 7—7 of FIG. 6;

FIG. 8 is a vertical section view taken along lines 8—8 of FIG. 6;

FIG. 11 is a vertical section view of the embodiment shown in FIG. 6, utilizing another method of speed control.

DESCRIPTION OF THE PREFERRED EMBODIMENTS

Figure 9:
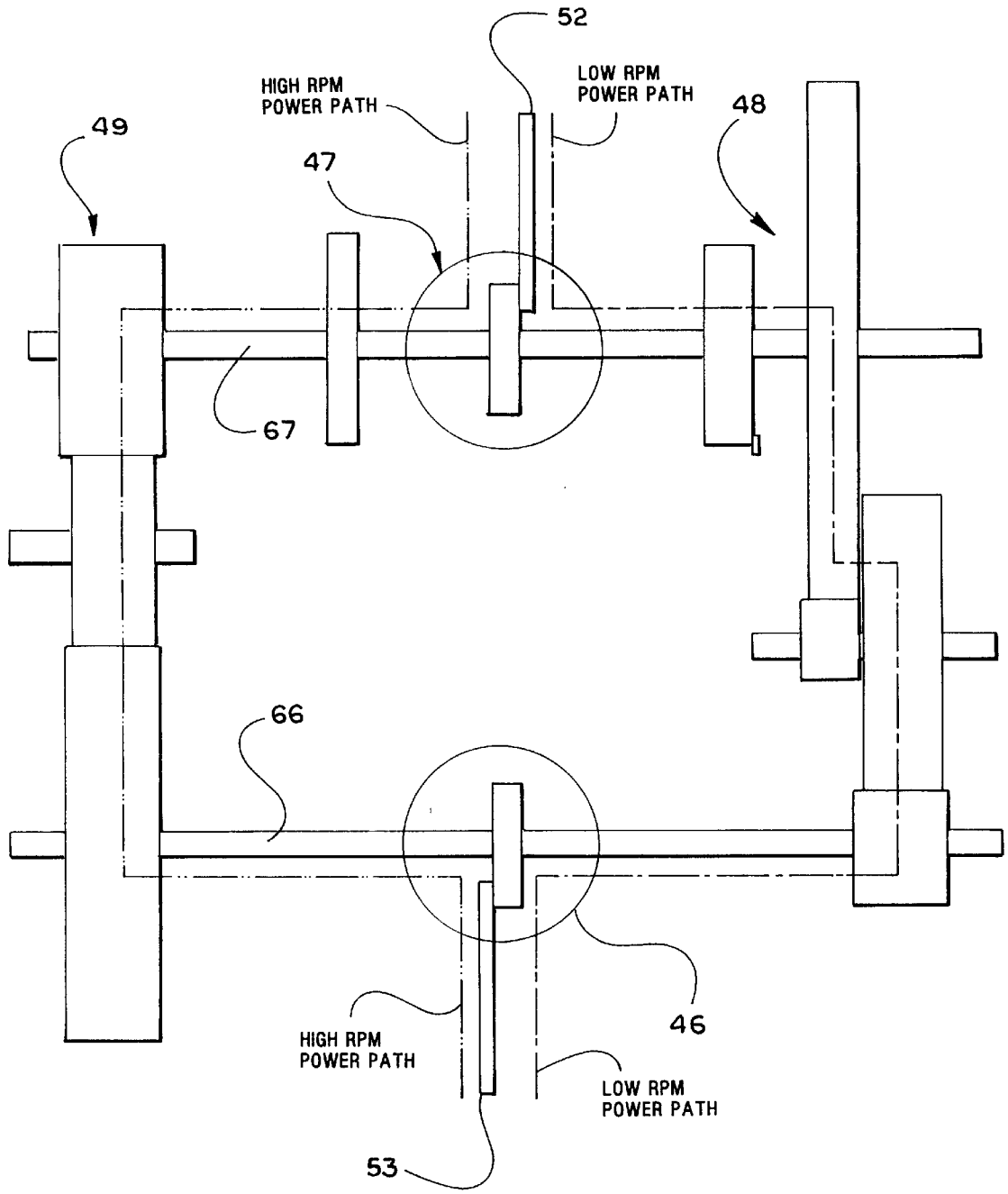
FIG. 9 is a diagrammatic view showing the power paths of the embodiment of FIG. 6.
Figure 10:
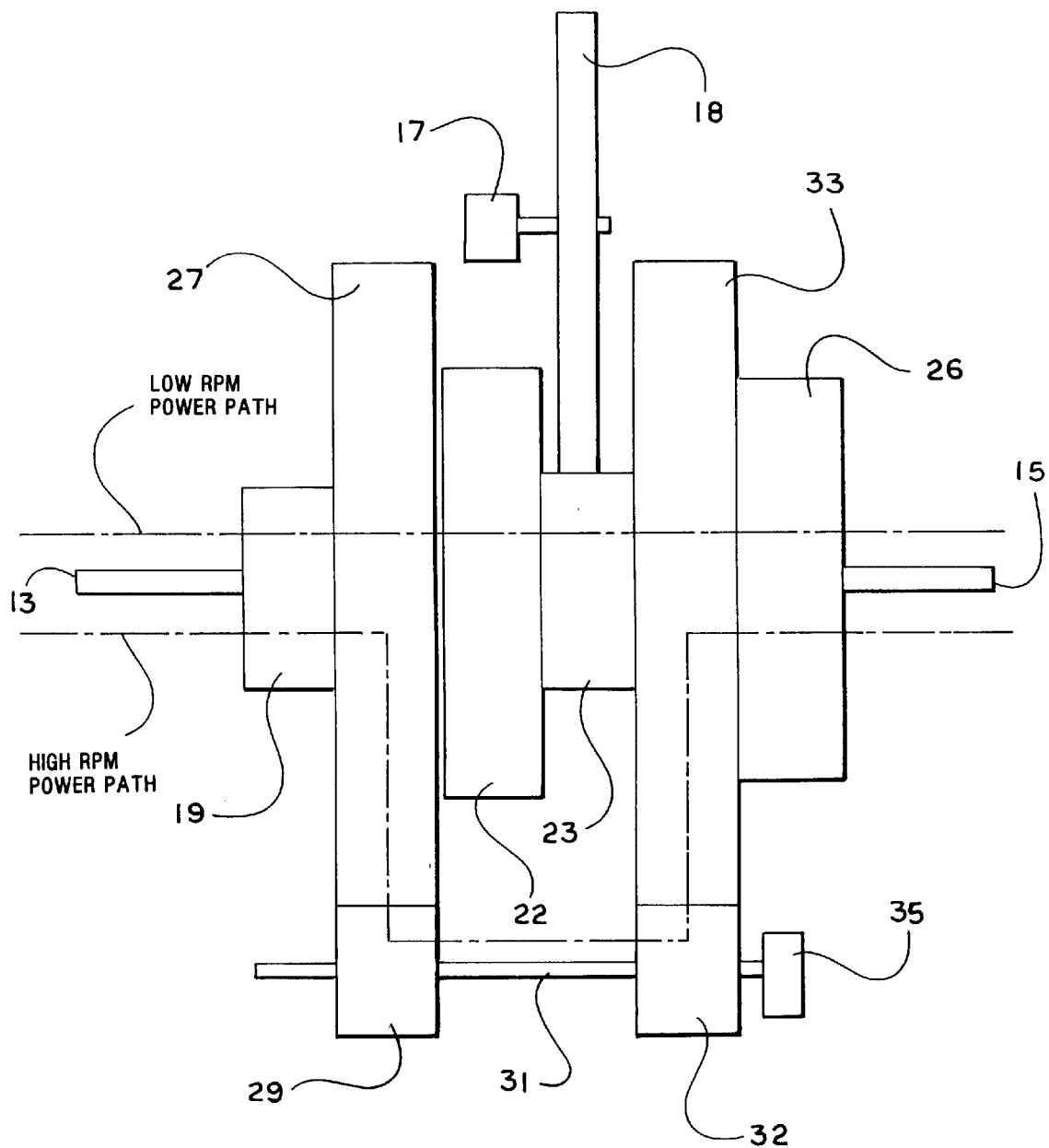
FIG. 10 is a diagrammatic view of the power paths of the embodiment of FIG. 1.

Referring to the drawings wherein like reference numerals designate corresponding parts throughout the several figures, reference is first made to the embodiment as shown in FIG. 1. In the embodiment of FIG. 1, two planetary gear sets 11 and 12 are shown connected in series. The first planetary divider gear set 11 acts as a power divider and is used for low rpm output. The second planetary gear set 12 is used as a power combiner and as a direct rpm output. Power inputted to the planetary power divider gear set 11 through the input shaft 13 will take the path of least resistance and pass onto the input shaft 14 of the planetary power combiner gear set 12, and, subsequently, out through the combiner output shaft 15.

The power flow in the low rpm/high torque mode will be with the control valve 16 open (shown in a schematic representation). When the control valve is open, a hydraulic pump 17, which is connected through gearing 18 to the shaft 14 between the planetary power divider 11 and the planetary power combiner 12, does not offer much resistance to the pump drive gears 18 which interconnect with the shaft between the planetary power divider 11 and the planetary power combiner 12. Power flows to the transmission through input shaft 13 to the sun gear 19 of the planetary power divider. Thence, the power is transferred to the planet gears 21 to the planet gear holder 22, which is splined to the power combiner input shaft 23. From here, the power is transferred to the power combiner sun gear 24 and thence to the combiner planet gears 25. At this point, the power is transferred to the combiner planet gear holder 26 which is splined to the combiner output shaft 15, and ultimately to the vehicle which the transmission drives.

The power flow in the high rpm/low torque mode will be with the valve 16 closed. When the valve 16 is closed, the hydraulic pump 17 offers a high resistance and essentially will not be turning. The power will now flow from the power divider input shaft 13 to the power divider sun gear 19, and thence to the divider planet gears 21. In this instance, the power would then be transferred to the power divider annular ring gear 27 and thence to the power divider high rpm power gear 28, and then through the high rpm connecting gears 29 to the connecting shaft 31. As seen in FIG. 1, the connecting shaft 31 thence transfers the power to the power combiner high rpm connecting gear 32 to the power combiner high rpm power gear 30 and thence to annular ring gear 33, and thence to the planet gears 25. The power then is transferred to the power combiner planet carrier 34 which has the combiner output shaft 15 attached thereto. The overrunning clutch 35 is anchored to the transmission case 36 to prevent reverse rotation of the higher rpm connecting gears 29 and of the connecting shaft 31.

Between the extremes of control valve 16 being fully opened and fully closed, intermediate ratios of rpm and torque are enabled by the control valve 16. By closing the valve 16, there is created more resistance to the low rpm mode. By gradually closing the valve 16, there will be a gradual force of power to the high rpm path enabling a continuously variable ratio to occur.

As can be seen in FIG. 4, the control valve can be opened and closed by a manual linkage 37, which may take the form of either a rod or cable linkage. The valve can also be controlled by a vacuum actuator 38, as the case may be. In the high power low rpm demand mode, the control valve is held open by spring 39 which would be suitably attached to the transmission case 40 or other suitable point. As the manifold vacuum increases through inlet tube 41 to the vacuum chamber 42, the diaphragm 43 pulls against the spring thereby closing the valve. It is normal in an engine with spark ignition that engine demand is manifested in the manifold vacuum. Low manifold vacuum equals high power demand or low rpm high torque. Conversely, high manifold vacuum equals low power demand or high rpm low torque. It is obvious that the transmission ratio would be controlled by these two factors, or by any given vacuum in between.

In FIG. 5 the control valve 16 is shown in an alternative control relationship, and can be opened and closed by an electric actuator 44 which is, in turn, controlled by a programmable logic computer 45 such as is manufactured by Siemens Energy And Automation of Johnson City, Tenn. The computer option would be desirable for use with diesel engines, or to increase economy and performance of gasoline engines. Some of the inputs to the programmable logic computer would be engine oil pressure, coolant temperature, manifold vacuum, engine rpm, atmospheric pressure or vehicle speed. Others, such as cruise control, could easily be added and built into the computer.

It is obvious that this invention could be used as the last stages of a three or four speed automatic transmission. In the preferred embodiment of FIG. 1, power is applied to input shaft 13 of the power divider 11 and, when the control valve 16 is closed, an infinite resistance is applied to the output shaft of the power divider 11 by the hydraulic pump 17 forcing the power to take the high rpm path through the power divider 11, and subsequently through the power divider annular ring gear 27 where it is transferred ultimately to the power combiner annular ring gear 33 and thence to the output shaft 15. When the control valve 16 is in an intermediate position, the power will divide to both paths depending upon the resistance of the hydraulic pump 17 acting upon the pump drive gears 18. When the control valve 16 is fully opened, little resistance is applied to the output shaft 14 of the power divider thereby diverting the power through the low rpm gears of the combiner, thus enabling a continuously variable ratio to output shaft 15.

In a second embodiment of the invention as shown in FIG. 6, a power divider gear set 46 and a power combiner gear set 47 are shown. The power divider 46 is used to divide the power flow to either or both a low rpm gear train 48 or a high rpm gear train 49. The power is then combined in the power combiner 47 and thence to a pinion gear 51 and output shaft 52. The output is controlled by resistance to power flow in a low rpm gear train 48 by means of hydraulic pump 54 mounted on a power combiner low rpm side gear 55 and shaft 56. The hydraulic pump 54 is controlled by control valve 16 much in the same manner as described for the embodiment of FIG. 1.

When control valve 16 is opened, hydraulic pump 54 offers little resistance to power flow through low rpm gear train 48. When power is entering the transmission at input shaft 53, the high rpm power train offers relatively high resistance to turning and, therefore, power is transferred to the transmission through input shaft 53 which turns power divider pinion gear 57 and which then turns power divider ring gear 58 driving power divider planet carrier 59, which in turn drives power divider low rpm side gear and shaft 61. This, in turn, drives low rpm gear train 48, which powers the power combiner low rpm side gear and shaft 56, and transfers the resultant power to the combiner planet gears 63 and thence drives combiner planet gear carrier 62 to turn combiner ring gear 64, thereby driving pinion gear 51 and output shaft 52.

When the control valve 16 is closed, hydraulic pump 54 provides infinite resistance to the power flow through low rpm gear train 48 and power enters the transmission at input shaft 53. Input shaft 53 is connected to the power divider pinion gear 57 which turns power divider ring 58, which is fixed to power divider planet carrier 59. This, in turn, drives power divider high rpm side gear 65 and shaft 66 which then drives high rpm gear train 49 which, in turn, revolves a high rpm shaft 67 and side gear 68 to turn the combiner planet gears 63. This, then, powers combiner planet gear carrier 62 turning ring gear 64, thence pinion gear 51 and output shaft 52. The overrunning clutch 69 prevents reverse rotation of high rpm gear train 49.

In the embodiment of FIG. 6, when control valve 16 is opened, power will enter the transmission at whatever level the operator demands with the throttle so that the input shaft 53 will turn power divider pinion gear 57 driving divider ring gear 58, and turns divider planet carrier 59. Side gear 65 offers more resistance than side gear 61, therefore, high rpm gear train 49 will not turn and, consequently, the power divider high rpm side gear 65 and shaft 66 will not turn. In this case, power divider low rpm side gear 61 and shaft 60 will turn and will drive low rpm gear train 48, which will then drive power combiner low rpm side gear 55 and shaft 56. This will then turn combiner planet gears 63 transferring power to gear carrier 62, which will then power combiner ring gear 64 and, subsequently, pinion gear 51 and output shaft 52.

With control valve 16 closed, hydraulic pump 54 does not turn and offers great resistance to the low rpm gear train 48. Power will then flow from power divider planet carrier 59 turning power divider planet gears 71, and thence driving power divider high rpm side gear 65 and shaft 66. This, in turn, drives high rpm gear train 49 which then powers high rpm shaft 67 and side gear 68, thence driving combiner planet gears 63 and ultimately combiner planet carrier 62 and pinion gear 51 and output shaft 52.

When control valve 16 is partially closed, power will be divided to both the low rpm gear train 48 and the high rpm gear train 49. It is obvious that diameters of various gears would be selected based upon the application to which the transmission is to be applied. A novel feature of this transmission is this feature of gear change, even after installation on a vehicle. The overall ratios could be selected to fit the need of a particular user. Large highway trucks employed mostly in mountainous regions could have a different set of gears than those trucks employed mostly on flat terrain. The operator selects the rpm with the engine throttle and the rpm selected would depend upon which is more desired, power or economy. The output would be controlled manually by the operator or automatically by the control valve 16.

Another method of speed control is shown in FIG. 11 which depicts control unit 72 having a gear case 76 and worm gears 73, and an electric motor 74. The speed of the motor 74 controls the low rpm gear train speed through shaft 75 and shaft 56. The pump 54 does not act as a speed control in this method, but acts only as a lubrication source. The motor can be controlled by manual electric switches or by a programmable logic computer. The worm gears 73 offer resistance to the rotation of the low speed gear train, therefore, power would flow through the high speed gear train. Increasing the motor speed would drive worm rod 77 to rotate the worm wheel 78 to turn and produce low rpm power flow. Worm wheel speed would directly relate to the shaft 56.

As can be seen, the present invention provides a means for tailoring the input speed and torque of a power source to the load of the output driven member continuously, thereby increasing engine efficiency from which performance and fuel consumption rate are improved. In addition, the operator of a vehicle can control the output of the transmission automatically.

Various modifications may be made of the invention without departing from the scope thereof and it is desired, therefore, that only such limitations shall be placed thereon as are imposed by the prior art and which are set forth in the appended claims.

What is claimed is:

1. A continuously variable ratio power transmission having a source of power connected to an input shaft comprising:

a power divider unit having a planetary gear set operatively driven by the input shaft and having a power divider planetary gear set carrier engaging the planetary gear set, a power divider annular ring gear engaging and surrounding the power divider planetary gear set, the power divider carrier being connected to an output shaft;

a power combiner unit having a planetary gear set operatively driven by an input shaft which is operatively connected to the output shaft of the power divider unit, the power combiner unit including a power combiner planetary gear set carrier and a power combiner annular ring gear engaging and surrounding the power combiner planetary gear set, the power combiner carrier being operatively connected to a transmission output shaft;

a hydraulic power diverting motion means connected to the power divider output shaft to selectively apply resistance to the rotation of the power divider output shaft; and a high speed connecting gear set operatively connecting the power divider annular ring gear to the power combiner annular ring gear to selectively transfer high speed power from the power divider unit to the output shaft of the power combiner unit.

2. A continuously variable ratio power transmission as claimed in claim 1 and further comprising an anti-reversing mechanism integrally connected to the connecting gear set to provide a one-direction rotation of the connecting gear set.

3. A continuously variable ratio power transmission as claimed in claim 2, wherein the anti-reversing mechanism is a one-way clutch.

4. A continuously variable ratio power transmission as claimed in claim 2, wherein said hydraulic power diverting motion means comprises a hydraulic pump and a valve means controlling fluid output from the hydraulic pump.

5. A continuously variable ratio power transmission as claimed in claim 4, wherein the hydraulic pump braking means further comprises a shaft from the hydraulic pump, a drive gear connected to the hydraulic pump, said drive gear being connected to the power divider output shaft to transmit hydraulic power diverting motion applied by the hydraulic pump to the power divider output shaft.

6. A continuously variable ratio power transmission as claimed in claim 5, wherein the valve means controlling the hydraulic pump is a manual linkage operatively connected to the valve means.

7. A continuously variable ratio power transmission as claimed in claim 5, wherein the valve means controlling the hydraulic pump is a vacuum system operatively connected to the valve means.

* * * * *